(12) United States Patent
Gilbert et al.

(10) Patent No.: US 11,095,610 B2
(45) Date of Patent: Aug. 17, 2021

(54) METHODS AND APPARATUS FOR AUTONOMOUS NETWORK SEGMENTATION

(71) Applicant: Blue Ridge Networks, Inc., Chantilly, VA (US)

(72) Inventors: Thomas A. Gilbert, Fairfax, VA (US); Mukesh Sharma, Oak Hill, VA (US); Srinivas R. Mirmira, Bethesda, MD (US)

(73) Assignee: Blue Ridge Networks, Inc., Chantilly, VA (US)

( * ) Notice: Subject to any disclaimer, the term of this patent is extended or adjusted under 35 U.S.C. 154(b) by 12 days.

(21) Appl. No.: 16/575,589

(22) Filed: Sep. 19, 2019

(65) Prior Publication Data
US 2021/0092093 A1    Mar. 25, 2021

(51) Int. Cl.
*H04L 29/06* (2006.01)
(52) U.S. Cl.
CPC .......... *H04L 63/0209* (2013.01); *H04L 63/02* (2013.01); *H04L 63/029* (2013.01); *H04L 63/062* (2013.01); *H04L 63/1408* (2013.01); *H04L 63/1425* (2013.01); *H04L 63/20* (2013.01)

(58) Field of Classification Search
None
See application file for complete search history.

(56) References Cited

U.S. PATENT DOCUMENTS

| | | | |
|---|---|---|---|
| 6,898,632 B2* | 5/2005 | Gordy | H04L 63/1408 709/224 |
| 6,922,774 B2 | 7/2005 | Meushaw et al. | |
| 7,512,981 B2* | 3/2009 | Pearson | H04L 29/06 726/23 |
| 7,712,143 B2 | 5/2010 | Comlekoglu | |
| 7,809,955 B2 | 10/2010 | Comlekoglu | |
| 8,059,530 B1* | 11/2011 | Cole | H04L 41/5025 370/229 |
| 9,426,178 B1* | 8/2016 | Yanovsky | H04L 63/101 |
| 9,531,593 B2* | 12/2016 | Baum | H04L 41/28 |
| 10,027,699 B2* | 7/2018 | Wei | G06F 21/554 |
| 10,225,133 B2* | 3/2019 | Sakakura | H04L 41/0246 |
| 10,574,670 B1* | 2/2020 | Verma | H04W 76/12 |
| 10,601,691 B2* | 3/2020 | Chandrasekaran | H04L 41/142 |
| 10,609,016 B2* | 3/2020 | Goeringer | H04L 63/0236 |

(Continued)

*Primary Examiner* — Michael W Chao
(74) *Attorney, Agent, or Firm* — Cooley LLP

(57) ABSTRACT

An apparatus includes a first communication interface communicable with a portion of a first network, a second communication interface communicable with a portion of a second network, and a memory. The apparatus is configured to be disposed between the portion of the first network and the portion of the second network. The portion of the first network and the portion of the second network are not otherwise coupled together. The apparatus is switchable between a first mode and a second mode. During the first mode, the apparatus is transparent to data transmission and is configured to store information representing the transmitted data. During the second mode, the apparatus is configured to block data transmission between the first network and the second network via the apparatus so as to form an enclaved network segment of the portion of the first network.

20 Claims, 11 Drawing Sheets

(56) References Cited

U.S. PATENT DOCUMENTS

| | | | |
|---|---|---|---|
| 10,671,765 B2* | 6/2020 | Swierk | G06F 21/86 |
| 10,791,142 B2* | 9/2020 | Ranum | H04L 61/1511 |
| 10,819,721 B1* | 10/2020 | Jenkins | H04L 43/045 |
| 2003/0088696 A1* | 5/2003 | McCanne | H04L 29/06027 |
| | | | 709/238 |
| 2004/0103153 A1* | 5/2004 | Chang | H04L 12/2803 |
| | | | 709/206 |
| 2005/0047333 A1* | 3/2005 | Todd | H04L 29/06027 |
| | | | 370/229 |
| 2005/0210270 A1* | 9/2005 | Rohatgi | G06F 21/32 |
| | | | 713/186 |
| 2007/0101422 A1* | 5/2007 | Carpenter | H04L 63/14 |
| | | | 726/13 |
| 2007/0124577 A1* | 5/2007 | Nielsen | H04L 63/102 |
| | | | 713/151 |
| 2007/0192862 A1* | 8/2007 | Vermeulen | H04L 63/0236 |
| | | | 726/23 |
| 2009/0086692 A1* | 4/2009 | Chen | H04L 67/12 |
| | | | 370/338 |
| 2014/0336785 A1* | 11/2014 | Asenjo | G05B 19/4185 |
| | | | 700/17 |
| 2014/0337086 A1* | 11/2014 | Asenjo | G06Q 10/0635 |
| | | | 705/7.28 |
| 2015/0213369 A1* | 7/2015 | Brandt | H04L 63/1408 |
| | | | 706/12 |
| 2016/0050225 A1* | 2/2016 | Carpenter | G06F 21/577 |
| | | | 726/25 |
| 2016/0234229 A1* | 8/2016 | Carpenter | H04L 63/1433 |
| 2016/0277416 A1* | 9/2016 | Brandt | H04L 63/02 |
| 2016/0323323 A1* | 11/2016 | Yanovsky | H04L 41/0893 |
| 2016/0330222 A1* | 11/2016 | Brandt | H04L 63/1408 |
| 2016/0334765 A1* | 11/2016 | Duca | G05B 19/4186 |
| 2016/0366183 A1* | 12/2016 | Smith | H04L 63/101 |
| 2017/0063967 A1* | 3/2017 | Kitchen | H04L 67/10 |
| 2017/0227965 A1* | 8/2017 | Decenzo | H04L 67/025 |
| 2017/0289191 A1* | 10/2017 | Thioux | H04L 63/1441 |
| 2018/0054490 A1* | 2/2018 | Wadhwa | H04L 63/06 |
| 2018/0124089 A1* | 5/2018 | Nyhuis | H04L 63/1425 |
| 2018/0131551 A1 | 5/2018 | Murakami et al. | |
| 2018/0159880 A1* | 6/2018 | Sood | H04L 63/1425 |
| 2018/0198801 A1* | 7/2018 | Gopalakrishna | H04L 63/1491 |
| 2018/0253569 A1* | 9/2018 | Swierk | G06F 21/554 |
| 2020/0045023 A1* | 2/2020 | Yu | H04L 9/3247 |
| 2020/0099589 A1* | 3/2020 | Sethi | H04L 41/0853 |
| 2020/0195473 A1* | 6/2020 | Thubert | G06N 20/00 |
| 2020/0280490 A1* | 9/2020 | Srinivas | H04L 41/0893 |
| 2020/0322357 A1* | 10/2020 | Bryan | H04L 63/02 |
| 2020/0351989 A1* | 11/2020 | Ahmet | H04L 63/101 |

* cited by examiner

METHODS AND APPARATUS FOR AUTONOMOUS NETWORK SEGMENTATION

FIELD

One or more embodiments relate to apparatus, systems, and methods for autonomous network segmentation.

BACKGROUND

Complex computer networks are usually configured into multiple segments to boost performance and improve security. For example, industrial control systems are often isolated from traditional enterprise information technology (IT) systems to prevent "lateral attacks" of one set to the other. Known techniques for network segmentation, however, tend to disrupt the operation of at least a portion of the network. For example, one technique for network segmentation starts with passive collection of traffic matrix data, which can be achieved by, for example, placing temporary Ethernet taps at multiple collection points within the network over an appropriate period of time. The collected data can be sampled to determine which network segments contain target devices (e.g., devices that are vulnerable to certain attacks) and accordingly to determine the appropriate locations to insert segmentation devices to form one or more segments. The data collection/sampling and subsequent insertion of the segmentation devices may create temporary disruption in the network. In addition, if a network is divided into multiple network segments, the devices contained within each segment are usually configured to be able to interoperate across these segments, thereby further prolonging the disruption.

SUMMARY

Some embodiments described herein relate generally to network segmentation, and, in particular, to methods and apparatus for autonomous and secure network segmentation using reconfigurable devices. In some embodiments, an apparatus includes a first communication interface configured to be communicable with a portion of a first network and a second communication interface configured to be communicable with a portion of a second network. The apparatus also includes a memory operatively coupled to the first communication interface and the second communication interface. The apparatus is configured to be disposed at a location between the portion of the first network and the portion of the second network. The portion of the first network and the portion of the second network are not otherwise coupled together. The apparatus is switchable between a first mode and a second mode. During the first mode, the first communication interface and the second communication interface are transparent to data transmitted between the first network and the second network. The first communication interface and the second communication interface are also configured to store information representing the data that is transmitted between the first network and the second network to the memory. During the second mode, the first communication interface and the second communication interface are configured to block data transmission between the first network and the second network via the apparatus so as to form an enclaved network segment of the portion of the first network.

In some embodiments, a system includes a management device and a reconfigurable device operatively coupled to the management device. The reconfigurable device is disposed at a location between a portion of a first network and a portion of a second network. The portion of the first network and the portion of the second network are not otherwise coupled together. The reconfigurable device is switchable between a first mode and a second mode based on a control signal received from the management device. During the first mode, the reconfigurable device is configured to transmit data between the first network and the second network and collect information representing the data that is transmitted between the first network and the second network. During the second mode, the reconfigurable device is configured to block data between the first network and the second network so as to form an enclaved network segment of the first network.

In some embodiments, a method includes receiving information from a reconfigurable device disposed at a location between a portion of a first network and a portion of a second network. The portion of the first network and the portion of the second network are not otherwise coupled together. The information represents data that is transmitted between the first network and the second network. The reconfigurable device being switchable between a first mode and a second mode. During the first mode, the reconfigurable device is configured to transmit data between the first network and the second network and collect the information representing the data that is transmitted between the first network and the second network. During the second mode, the reconfigurable device is configured to block data between the first network and the second network so as to form an enclaved network segment of the portion of the first network. The method also includes generating a control signal based at least in part on the information representing data that is transmitted between the first network and the second network. The method also includes sending the control signal to the reconfigurable device to cause the reconfigurable device to operate in the second mode.

BRIEF DESCRIPTION OF THE DRAWINGS

The drawings primarily are for illustration purposes and are not intended to limit the scope of the subject matter described herein. The drawings are not necessarily to scale; in some instances, various aspects of the disclosed subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

Figure 1:
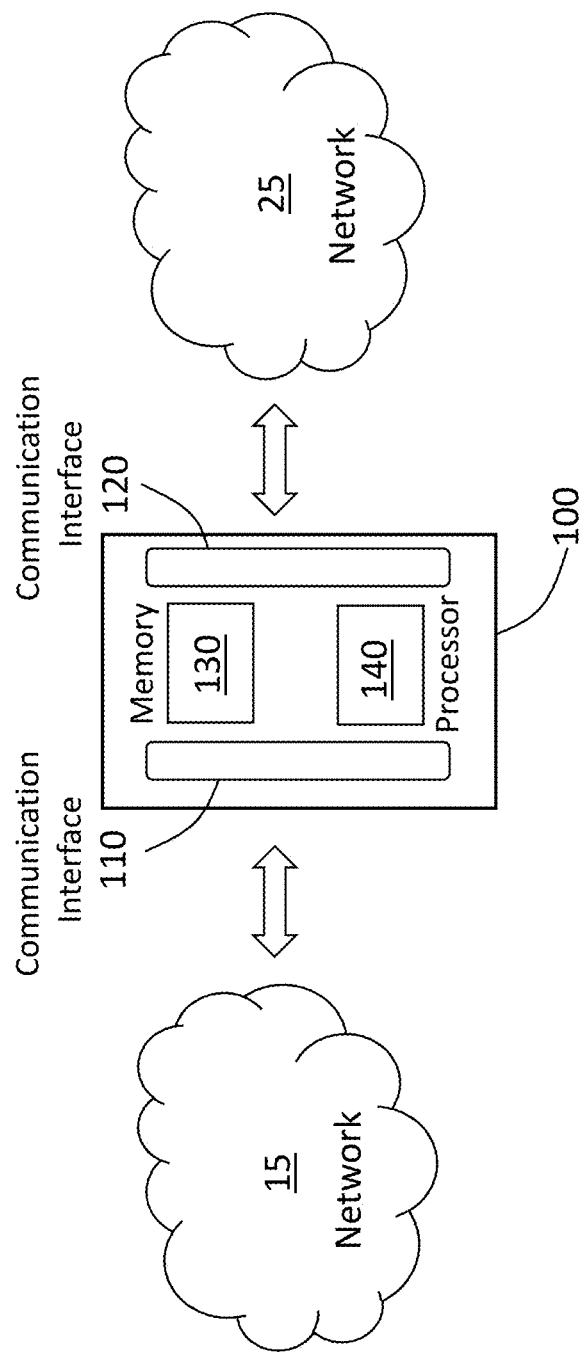
FIG. 1 shows a schematic of an apparatus for autonomous network segmentation, according to an embodiment.

Methods, apparatus, and systems described herein employ one or more reconfigurable devices for autonomous network segmentation. The reconfigurable device includes a first communication interface (also referred to as an inside communication interface) configured to be communicable with a portion of a first network, and a second communication interface (also referred to as an outside communication interface) configured to be communicable with a portion of a second network. In addition, the reconfigurable devices has at least two modes. During the first mode (also referred to as transparent mode), the first communication interface and the second communication interface are configured to pass data transmitted between the first network and the second network (i.e., the reconfigurable device is transparent to the data transmission). The reconfigurable device is also configured to collect and/or store information representing the data that is transmitted between the first network and the second network. During the second mode (also referred to as the block mode or the isolation mode), the reconfigurable device is configured to block data transmission between the first network and the second network via the first and second communication interfaces.

In some embodiments, the one or more reconfigurable devices are disposed at candidate choke points in a network for autonomous segmentation of the network. As used herein, a choke point refers to a cut-point between downstream and upstream network traffic. For example, a choke point can be a location connecting the portion of the first network and the portion of the second network, and the portions of the first network and the second network are not otherwise coupled together. In some embodiments, a choke point or a candidate choke point can be physically between two networks. In some embodiments, a choke point or a candidate choke point is not physically between two networks; instead, the choke point or the candidate choke point can be located on the communication path between the two networks.

The one or more reconfigurable devices can be configured in the transparent mode to pass network traffic between the portion of the first network and the portion of the second network. The one or more reconfigurable devices also function as active Ethernet taps to collect traffic matrix information that can be used to estimate whether the candidate choke points are actual choke points.

In some embodiments, each reconfigurable device is also configured to securely connect to a management device (e.g., an aggregator). In some implementations, each candidate segment (also referred to as a candidate network portion, a candidate enclaved segment, or a target segment) has at least one management device. In these embodiments, each reconfigurable device can attempt to connect securely to the management device while continuing to transparently pass existing network traffic. The secure connection between the reconfigurable devices and the management device can function as a management channel that allows the management device (e.g. a central server, a root server, or a master server) to periodically collect the traffic matrix information from all reconfigurable devices.

If analysis of the aggregated data confirms the appropriate placement of one or more reconfigurable devices (i.e., placed at actual choke points), then the management channel is used to direct each reconfigurable device to switch to the isolation mode, thereby forming one or more enclaved segments. In some embodiments, appropriate placement of a reconfigurable device means that all network devices on one side of the reconfigurable device (e.g., within the portion of the first network) are communicating either among themselves or only with network devices via another reconfigurable device. In this event, switching the reconfigurable device into the isolation mode can create an enclaved segment of the portion of the first network. If one or more excluded device(s) are intended to be part of a candidate enclaved segment, one or more additional reconfigurable devices can be emplaced to enclose these devices.

In some embodiments, the one or more reconfigurable devices can be disposed at locations that are known choke points. In these embodiments, the reconfigurable devices can be switched to the isolation mode without the data aggregation and analysis described above.

Once an enclaved segment is created, devices within the enclaved segment can only communicate with other devices within the same enclaved segment. In some implementations, an enclaved segment can be defined by multiple reconfigurable devices that are connected to a common management device. In these implementations, a device connected to the inside communication interface of one reconfigurable device can still communicate with another device connected to the inside communication interface of another reconfigurable device managed by the same management device.

In some embodiments, network traffic that arrives at the outside communication interface of a reconfigurable device in the isolation mode is sent for cryptographic authentication. Upon successful authentication, the network traffic is decrypted and passed into the enclaved segment. Upon unsuccessful authentication, the network traffic is discarded. Accordingly, any attempts to send illegitimate network packets into the enclaved segment are ignored and a potential attacker may not even determine if a network device exists at the outside address assigned to the reconfigurable device. In some embodiments, the cryptographic authentication can be achieved using the communication techniques described in U.S. application Ser. No. 16/240,445, entitled "METHODS AND APPARATUS FOR QUANTUM-RESISTANT NETWORK COMMUNICATION" and filed Jan. 4, 2019, which is incorporated herein in its entirety.

The autonomous segmentation technique described herein allows time synchronous transition of one or more reconfigurable devices into the isolation mode. In these embodiments, devices that are connected to the inside communication interface of these reconfigurable devices become non-discoverable and non-addressable by all other devices not within the enclaved segment. In addition, the defining of an enclaved segment is non-disruptive and can be transparent to all devices (e.g., without reconfiguring the devices or sending any information to the devices) within the candidate enclave (including those devices communicating with others in disparate segments that become part of the same enclaved segment). The autonomous segmentation can also be achieved without making changes to devices within the created enclaved segment, including their network addresses. Furthermore, the autonomous segmentation technique can completely decouple interior and exterior network address space dependencies. Once an enclaved segment is defined, any address changes of a network device inside or outside the enclave boundary cannot be sensed nor affect others on the other side.

As can be seen from the description herein, the autonomous segmentation technique has several advantages over alternative techniques. First, the autonomous segmentation technique can reduce or eliminate network disruption by using only a single device emplacement event at each choke point. Additionally, this technique supports synchronized activation of all devices to redirect operational traffic. In many instances, the enclave redirection can be undetectable. More specifically, in the isolation mode, operational network segment traffic (also referred to as operational traffic) is "redirected" into the enclaved segment. Although still traveling across the pre-existing network, the operational traffic is cryptographically encapsulated. Therefore, the segment devices may only communicate amongst themselves and other enclave segment devices. In addition, data analysis collected in the transparent mode ensures that no device is cut off from its previous dialogs. As used herein, operational traffic refers to a subset of network traffic. The ultimate configuration isolates operational traffic from the general network as the primary protection mechanism.

Second, the autonomous segmentation technique can reduce the cost of initial installation. Such cost reduction can be especially advantageous for operational technology (OT) networks that spread over multiple sites, which may be geographically distant. The autonomous segmentation technique generally has no inherent limitation in the number of reconfigurable devices to be used or segments to be defined.

Third, when the reconfigurable devices are switched to the isolation mode, they can continue to collect and report traffic matrix data using an independent management plane (e.g., the management channel between the reconfiguration device and the management device). This allows operational visibility for the customer and the ongoing techniques/processes to detect unexpected operation of devices not previously detected.

FIG. 1 shows a flowchart illustrating an apparatus 100 (also referred to as a reconfigurable device or a reconfigurable compute device) for autonomous network segmentation, according to an embodiment. The apparatus 100 includes a first communication interface 110 configured to be communicable with a portion of a first network 15, and a second communication interface 120 configured to be communicable with a portion of a second network 25. In the description herein, the portion of the first network 15 is used as a target network (i.e., the network to be enclaved into a segment) for illustration purposes. In this case, the first communication interface 110 is also referred to as the inside communication interface 110 and the second communication interface 120 is also referred to as the outside communication interface 120.

The apparatus 100 also includes a memory 130 operatively coupled to the first communication interface 110 and the second communication interface 120. The memory 130 can be configured to store, for example, traffic information about the network traffic that passes through (or attempts to pass through) the apparatus 100. In some embodiments, the memory 130 can also be configured to store processor executable instructions. In these embodiments, the apparatus 100 can also include a processor 140 operatively coupled to the memory 130, the first communication interface 110, and the second communication interface 120. Upon execution of the processor-executable instructions, the processor 140 can control the apparatus 100 to implement various methods described herein (e.g., sending traffic information to an aggregator).

The apparatus 100 is switchable (or reconfigurable) between at least two modes: a first mode and a second mode. During the first mode (also referred to as the transparent mode), the first communication interface 110 and the second communication interface 120 are transparent to data transmitted between the first network 15 and the second network 25. For example, the apparatus 100 can pass the data without processing. In addition, the apparatus 100 is configured to collect information representing the data that is transmitted between the first network 15 and the second network 25 (also referred to as traffic matrix information) and store the information to the memory 130. In some embodiments, the traffic matrix information can be collected via network interface (NIC) data collection, such as Remote Network MONitoring (RMON). In some embodiments, the RMON agents can be built into the first communication interface 110 and the second communication interface 120. In some embodiments, the RMON agents can include a separate network tap to collect the traffic matrix information.

During the second mode (also referred to as the block mode or the isolation mode), the first communication interface 110 and the second communication interface 120 are configured to block data transmission between the first network 15 and the second network 25 via the apparatus 100. In some embodiments, the apparatus 100 is configured to be disposed at a location between the portion of the first network 15 and the portion of the second network 25, and the portion of the first network 15 and the portion of the second network 25 are not otherwise coupled together. As described herein, such location can be referred to as a choke point. In these embodiments, switching the apparatus 100 into the isolation mode can create an enclaved network segment of the portion of the first network 15.

In some embodiments, the apparatus 100 can be disposed at a candidate choke point or a potential choke point. For example, the apparatus 100 can be disposed at a potential choke point during the construction of a network. As the construction of the network progresses, the potential choke point can become an actual choke point. Alternatively, the potential choke point may not become an actual choke point, in which case the apparatus 100 can be configured into the transparent mode to pass network traffic while at the same time collecting traffic matrix information. In the event that the network topology changes and the potential choke point becomes an actual choke point, the apparatus 100 can be readily switched to the isolation mode to define an enclaved segment without disrupting the operation of the network.

The communication interfaces 110 and 120 can include any suitable component that can place the apparatus 100 in communication with another device or entity. In some embodiments, the communication interfaces 110 and 120 include a network interface card, such as an Ethernet port, a WiFi® radio, a Bluetooth® radio (e.g., a Bluetooth® antenna), a near field communication (NFC) radio, and/or a cellular radio. In some embodiments, the communication interfaces 110 and 120 are configured to communicate with another entity via wired communication (e.g., via a cable). In some embodiments, the communication interfaces 110 and 120 are configured to communicate with another entity via wireless communication (e.g., WiFi®). In some embodiments, the first communication interface 110 and the second communication interface 120 can communicate via the same type of protocol. In some embodiments, the first communication interface 110 and the second communication interface 120 can communicate via different types of protocols (e.g., one using wireless communication and the other using wired communication).

The memory 130 can include, for example, a random access memory (RAM), a memory buffer, a hard drive, a database, an erasable programmable read-only memory (EPROM), an electrically erasable read-only memory (EE- PROM), a read-only memory (ROM) and/or so forth. The processor 140 include a general purpose processor, a Field Programmable Gate Array (FPGA), an Application Specific Integrated Circuit (ASIC), a Digital Signal Processor (DSP), and/or the like.

The first network 15 and the second network 25 can include any network referenced in the IEEE 802 standards, such as standardized abstractions for the use of wired and wireless media like Ethernet, Bluetooth, Wi-Fi, and cellular type networks. The first network 15 and the second network 25 can also include, for example, non-802 standard networks, such as point-to-point communications links over terrestrial and satellite infrastructure. In some implementations, at least one of the first network 15 or the second network 25 includes a heterogeneous network, such as a hybrid of wired network and a wireless network or any other combinations.

In some implementations, the first network 15 and the second network 25 include the same type of network (e.g., both are wired or wireless networks). In some implementations, the first network 15 and the second network 25 can include different types of networks (e.g., one including an IEEE 802 standard network and the other including a non-802 standard network).

In some implementations, the first network 15 includes an operational technology (OT) network. The OT network can be configured to support infrastructure, such as manufacturing, national defense, and utilities (e.g., building infrastructure that operates facility systems including lights, elevators, and heating and cooling systems). In some implementations, the first network 15 includes an information technology (IT) network. In some implementations, the first network 15 includes an Internet network. In some implementations, the first network 15 can include a combination of one or more of the above mentioned networks.

Figure 3A:
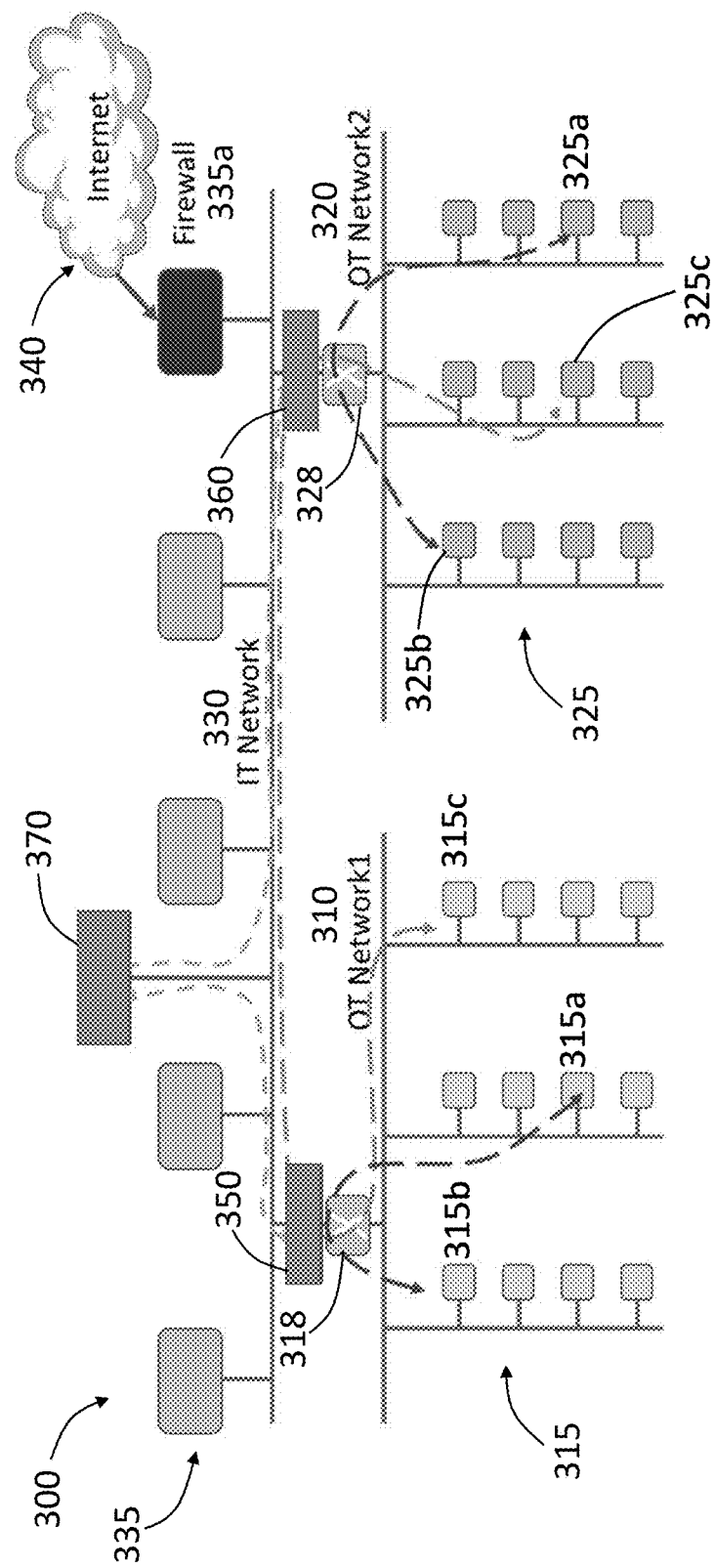
FIGS. 3A-3D illustrate autonomous segmentation of a network including operational technology (OT) networks and information technology (IT) networks using reconfigurable devices, according to an embodiment.
Figure 3B:
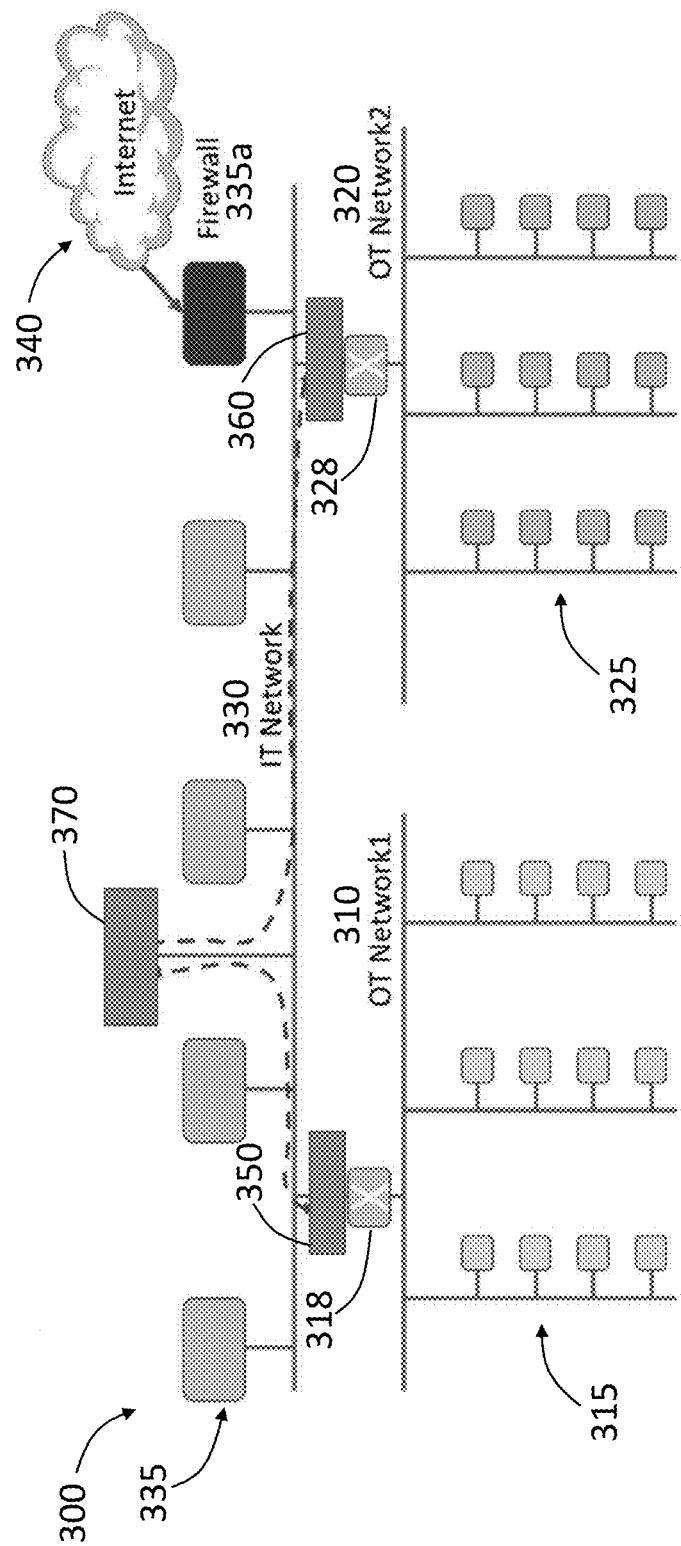

In some implementations, the first network 15 and the second network 25 are configured to communicate via an IT network or an Internet network (see, e.g., FIGS. 3A-3B). Such sharing of the IT network or the public network has economic benefits (e.g., reducing cost of network construction and operation) but may also incur risks of lateral attacks from the IT network and/or the Internet. The apparatus 100, however, can define an enclaved segment of the first network 15 (or at least a portion of the first network 15), thereby shielding the enclaved segment from these lateral attacks. As described herein, defining the enclaved segment is achieved without building additional networks or other disruptions to the existing devices. Accordingly, the autonomous segmentation technique allows a user to continue taking advantage of the available bandwidth in IT and Internet networks without the risk of lateral attacks.

In some embodiments, the processor 140 in the apparatus 100 can be configured as a controller to a control signal from a management device (e.g., an aggregator). The control signal can instruct the processor 140 to switch the apparatus 100 between the first mode and the second mode. In some embodiments, the processor 140 can be configured to periodically send the traffic matrix information collected by the apparatus 100 to a master management device (also referred to as a central management device or a root management device) via the aggregator.

In some embodiments, the transmission of the traffic matrix information to the master management device (not shown in FIG. 1) is via the second communication interface 120. In some embodiments, the transmission of the traffic matrix information to the central management device is via an additional communication interface (not shown in FIG. 1). In some embodiments, the control signal that instructs the apparatus 100 to operate in the first mode or the second mode is generated by the central management device based at least in part on the received traffic matrix information.

In some embodiments, the apparatus 100, when operating in the isolation mode, is configured to communicate only with devices with pre-shared keys for verification of identity. If another device attempts to communicate with the apparatus 100 without successful verification, the apparatus 100 is configured to discard any received package.

Figure 2:
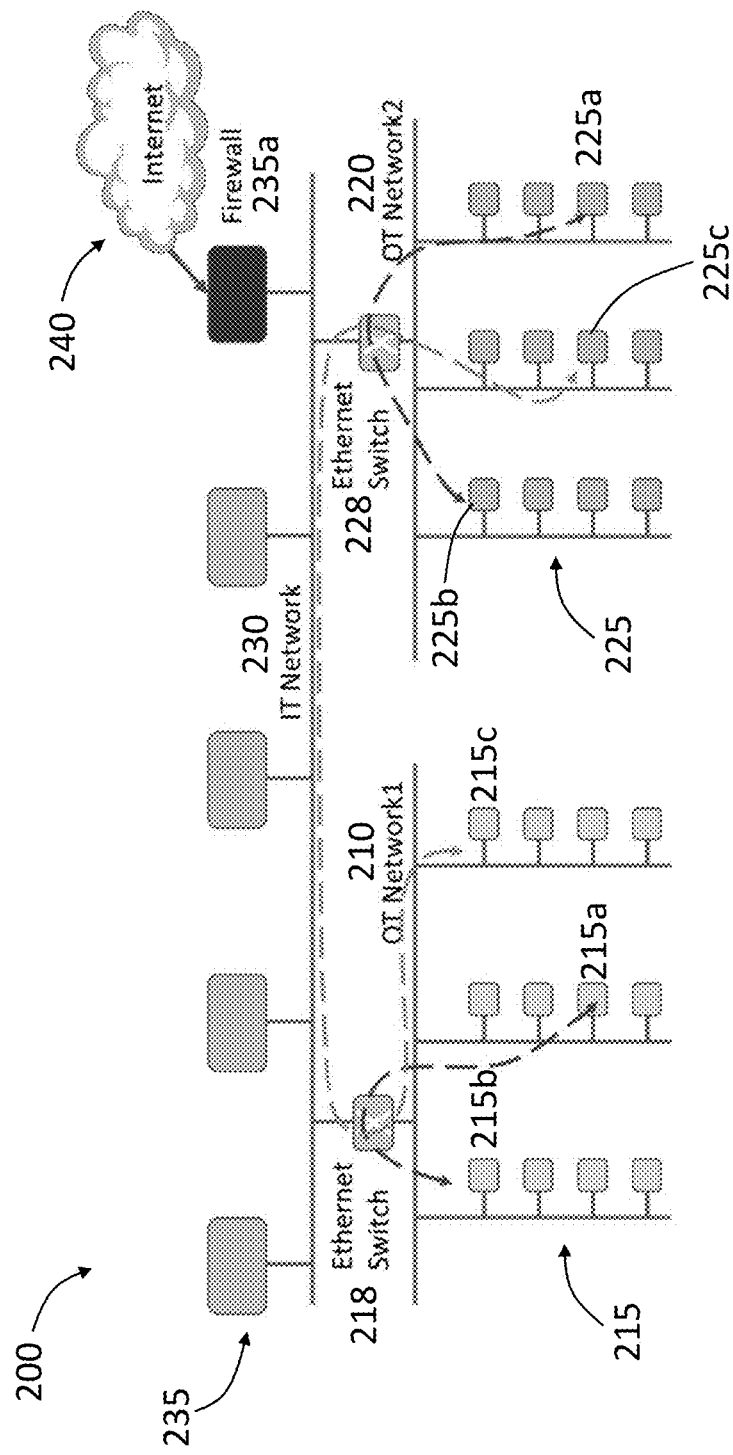
FIG. 2 shows a schematic of a network that can be segmented using the apparatus 100 shown in FIG. 1.

FIG. 2 shows a schematic of a network 200 that can be segmented using the autonomous segmentation technique described herein. The network 200 includes a first OT network 210 and second OT network 220. The two OT networks 210 and 220 share the use of an IT network 230 to communicate with each other. The first OT network 210 includes multiple devices 215 (three devices 215a, 215b, and 215c are labelled for illustration purposes) and the second OT network 220 includes multiple devices 225 (three devices 225a, 225b, and 225c are labelled for illustration purposes).

The devices 215 and 225 in the OT networks 210 and 220, respectively, can include any set of computers and networks intended for data collection, communications, and control that are typically not intended to be publicly accessible. For example, the devices 215 and 225 can include manufacturing and process control systems, building management systems, physical security cameras and access control systems, the credit authorization (PCI) systems in retail stores, SCADA equipment in oil fields, aircraft control systems, digital video and voice communication infrastructure, among others. This is contrasted with all IT enterprise systems that are usually publicly accessible to communicate with traveling employees, partners, suppliers, and customers.

The first OT network 210 is connected to the IT network 230 via a first network switch 218, and the second OT network 220 is connected to the IT network 230 via a second network switch 228. The IT network 230 also includes multiple devices 235, such as a firewall 235a. The IT network 230 is connected to an Internet network 240 via the firewall 235a.

In the network 200, devices within the within each OT network (e.g., 210 or 220) communicate with each other via the corresponding network switch (e.g., 218 or 228). For example, as illustrated in FIG. 2, the device 215a communicates with the device 215b via the network switch 218, and the device 225a communicates with the device 225b via the network switch 228. Devices within one OT network (e.g., 210 or 220) communicate with devices within the other OT network (e.g., 220 or 210) via the IT network 230. For example, the communication path between the device 215c in the first OT network 210 and the device 225c in the second OT network 220 includes the first network switch 218, the IT network 230, and the second network switch 228.

Due to the sharing of the IT network 230, devices 215 and 225 within the OT networks 210 and 220, respectively, are subject to the risk of lateral attacks. More specifically, once an attacker manages to obtain access through the firewall 235a, the attacker is free to move within the OT networks 210/220 and the IT network 230. To prevent lateral attacks, the network 200 can be segmented using reconfigurable devices (e.g., the apparatus 100 shown in FIG. 1 and described herein), as illustrated in FIGS. 3A-3B below.

Figure 3C:
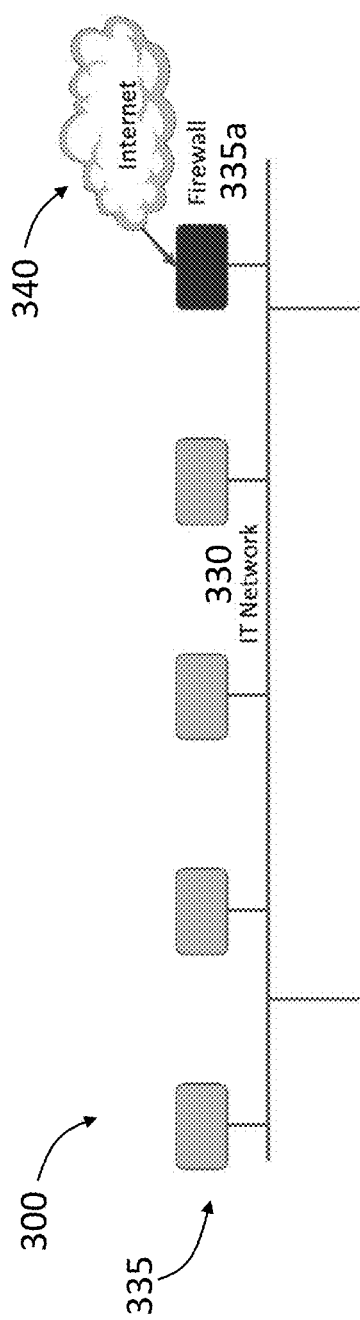
Figure 3D:
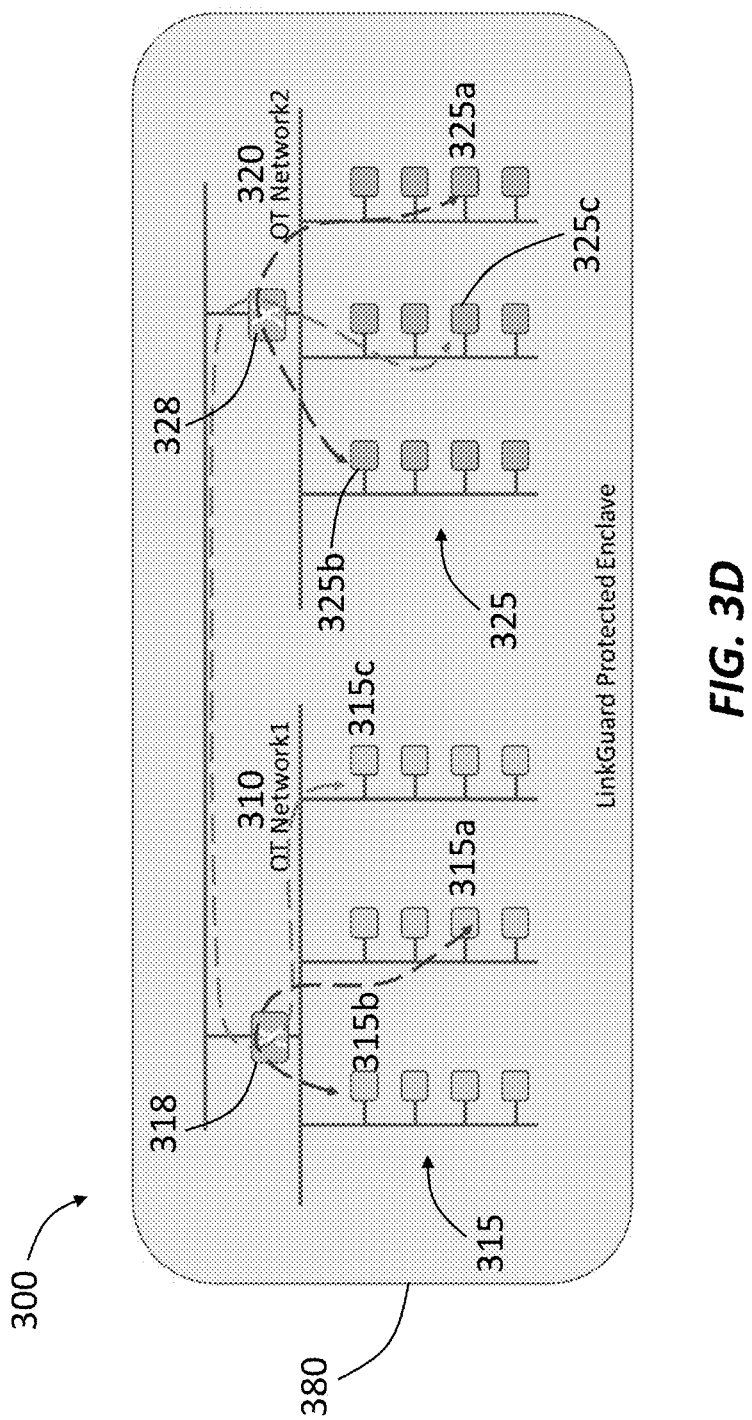

FIGS. 3A-3D illustrate autonomous segmentation of a network 300 using reconfigurable devices 350 and 360, according to an embodiment. FIG. 3A shows the network 300 when the reconfigurable devices 350 and 360 are configured in the transparent mode. FIG. 3B shows the network 300 when the reconfigurable devices 350 and 360 are configured in the isolation mode. FIGS. 3C and 3D illustrate what the IT network and the OT networks, respectively, can communicate with when the reconfigurable devices 350 and 360 are configured in the isolation mode.

The network 300 includes a first OT network 310 and second OT network 320 connected by an IT network 330. The first OT network 310 includes multiple devices 315 (three devices 315a, 315b, and 315c are labelled for illustration purposes) and the second OT network 320 includes multiple devices 325 (three devices 325a, 325b, and 325c are labelled for illustration purposes). The first OT network 310 is connected to the IT network 330 via a first network switch 318, and the second OT network 320 is connected to the IT network 330 via a second network switch 328. The IT network 330 also includes multiple devices 335, such as a firewall 335a. The IT network 330 is connected to an Internet network 340 via the firewall 335a.

The network 300 also includes a first reconfigurable device 350 collocated with the first network switch 318 and a second reconfigurable device 360 disposed beside the second network switch 228. In some embodiments, the first reconfigurable device 350 is connected to both the input interface and the output interface of the first network switch 318, and the second reconfigurable device 360 is connected to both the input interface and the output interface of the second network switch 328.

The two reconfigurable devices 350 and 360 are operatively coupled to a management device 370 (e.g., an aggregator). Each one of the reconfigurable devices 350 and 360 can be substantially identical to the apparatus 100 shown in FIG. 1 and described above. For example, each reconfigurable device 350 and 360 is switchable between the transparent mode and the isolation mode.

In some embodiments, for autonomous segmentation of the network 300, the reconfigurable devices 350 and 360 can be configured in the transparent mode to collect information about network traffic that passes through them. The collected information can be periodically sent to the management device 370 as illustrated in FIG. 3A. In some embodiments, the management device 370 can process the received information to determine the network topology (e.g., whether the locations of the reconfigurable devices 350 and 360 are appropriate choke points). In some embodiments, the management device 370 can forward the received information to a master server (not shown in FIGS. 3A-3D), which can process the received information (e.g., from multiple management devices) to determine the network topology.

If the collected information confirms that the reconfigurable devices 350 and 360 are placed at choke points (e.g., when the information shows that devices from the OT networks 310 and 320 are only communicating with themselves), the reconfigurable devices 350 and 360 are switched to the isolation mode (see FIG. 3B), thereby creating an enclaved segment 380 (see, FIG. 3D) that includes devices 315 within the first OT network 310 and devices 325 within the second OT network 320. In some implementations, the switching of the reconfigurable devices 350/360 into the isolation mode can be synchronous, i.e., both reconfigurable devices 350/360 are switched into the isolation mode simultaneously.

In some embodiments, the reconfigurable devices 350/360 and the management device 370 have pre-shared keys to identify verification and cryptographic communication. Therefore, devices from one OT network (e.g., 310) can still communicate with devices from the other OT network (e.g., 320). For example, the device 315c in the OT network 310 can attempt to send a packet to the device 325c in the OT network 320. The packet passes through the first reconfigurable device 350 and then arrives at the second reconfigurable device 360. Since the reconfigurable devices 350/360 and the management device 370 have pre-shared keys for cryptographic communication, the management device 370 can authenticate and/or decrypt the packet and then send the packet to the device 325c. In contrast, other devices, such as the devices 335 in the IT network 330, do not have pre-shared keys with the reconfigurable devices 350 and 360. Accordingly, packets sent by these devices 335 to devices 315 within the first OT network 310 are discarded by the first reconfigurable device 350, and packets sent to devices 325 in the second OT network 320 are discarded by the second reconfigurable device 360. In some embodiments, the cryptographic communication can be achieved using methods and apparatus described in U.S. application Ser. No. 16/240,445, entitled "METHODS AND APPARATUS FOR QUANTUM-RESISTANT NETWORK COMMUNICATION" and filed Jan. 4, 2019, which is incorporated herein in its entirety.

In some embodiments, the first reconfigurable device 350 is configured to encrypt packets from the first OT network 310 and send the traffic to the management device 370, which decrypts the packets and determines that the packets are towards, for example, the second OT network 320. The management device 370 then redirects the packets to the second OT network 320. In some embodiments, the first reconfigurable device 350 and the second reconfigurable device 360 do not have pre-shared keys and the communication between these two reconfigurable devices 350/360 are conducted through the management device 370. In some embodiments, the reconfigurable devices 350/360 are configured to dynamically detect traffic from the two OT networks 310/320 through the management device 370. Through a management channel, the two reconfigurable devices 350/360 can be provided each other's addresses and they can also create their own shared key to allow direct communication.

In some instances, the reconfigurable devices 350 and 360 can be placed into the network 300 after the rest of the network 300 is completed. In these instances, it may be clear that the locations of the network switches 318 and 328 are choke points and the reconfigurable devices 350 and 360 can be placed therein accordingly. In addition, the network 300 can be segmented without the data collection and analysis step to confirm the proper placement of the reconfigurable devices 350 and 360.

In some instances, the reconfigurable devices 350 and 360 can be placed into the network 300 during the construction of the network 300. For example, the network 300 can evolve over time, and the locations of the network switches 318 and 328 are only candidate choke points. In these instances, the reconfigurable devices 350 and 360 are set in the transparent mode to collect traffic matrix information. In the event that one or more of the reconfigurable devices 350 and 360 are not placed at a choke point, they can continue operate in the transparent mode without disrupting the rest of the network 300.

FIG. 3C illustrates that the newly created enclaved segment 380 is not discoverable by remote potential attackers, including the IT network 330. In other words, the potential attackers, including the IT network 330, does not detect or otherwise communicate with the enclaved segment 380. In addition, network scanning tools, such as "ping" or NMAP, are not able to discover the OT networks 310 and 320 either. In some implementations, this can be achieved by configuring the reconfigurable devices 350/360 and the management device 370 to only respond to other devices based upon each device having a unique cryptographic identity. The keys that enable verification of identity can be pre-shared among the devices (e.g., reconfigurable devices 350/360, and management device 370) by a management system (not shown) before the devices are emplaced.

FIG. 3D illustrates that devices within the enclaved segment 380 (e.g., devices 315 and 325) do not detect the presence of the reconfigurable devices 350/360 nor the management device 370. The devices within the enclaved segment 380 do not detect the existence of the enclaved segment 380 either, i.e., the devices do not know that they are actually within a protected segment. This feature can be useful in some critical infrastructure systems because these infrastructure systems may already contain sophisticated malicious software designed to detect and evade firewalls and VPNs.

FIGS. 3A-3D illustrate two reconfigurable devices 350/360 for illustration purposes only. In practice, the autonomous segmentation technique described herein can be extended to large scale networks using multiple reconfigurable devices, each of which is disposed at a potential choke point. These reconfigurable devices gather network traffic data that is sent to a management device for further processing. Based on the traffic data, the management device determines whether the reconfigurable devices are placed at proper locations and instructs those reconfigurable devices that are placed at choke points to switch to the isolation mode. During the segmentation process, the data collection/processing and the subsequent switching of reconfigurable devices into the isolation mode can be non-disruptive, operationally transparent, and simultaneous.

In some embodiments, the autonomous segmentation technique described herein can be used to define an enclaved segment including several subnetworks that are geographically far away from each other. In these embodiments, each subnetwork is coupled to at least one reconfigurable device, and the several reconfigurable devices can communicate with each other (and/or communicate with a management device) via the Internet (see, e.g., FIG. 4 below). In some embodiments, the autonomous segmentation technique described herein can be used to define an enclaved segment including heterogeneous networks. For example, the enclaved segment can include both OT devices and IT devices (see, e.g., FIGS. 5A-5B below).

In some embodiments, the autonomous segmentation technique described herein can be used to define a new enclaved segment within an existing enclaved segment without reconfiguration of devices in either segment (see, e.g., FIG. 6 below). In addition, the enclaved segments can intermingle over common network media without either segment being a proper subset of the other. In contrast, it can be challenging or even impractical for known segmentation techniques, such as IP Security (IPsec) technique, to achieve this tunnel-in-tunnel VPN type segmentation. More specifically, IPsec is an industry standard VPN protocol that, based upon user policy, sorts IP (network layer, layer 3) packets into categories based upon their layer 3 addresses and their layer 4 protocols. "Double tunneling" with IPsec usually involves encapsulation of the target packets to hide possible IP address conflicts.

The autonomous segmentation technique described herein can ignore the "inner" network layer packet addresses. In some embodiments, Ethernet frames (i.e., layer 2) addresses are inspected to determine the need for bridge forwarding. If the Ethernet frame includes an IP (i.e., network layer) address, it is ignored. This processing effectively separates "inner" and "outer" IP address spaces. Therefore, changes made in in one space do not cause conflict in the other space. This separation can be a significant advantage to users because it can eliminate costs associated with changing network nodes (e.g., moving, adding, deleting, or reconfiguring network nodes).

In addition, encapsulation packet length overhead in the known IPsec may cause packet fragmentation in the outer transport network. Such fragmentation, in turn, often leads to discarding of fragments and loss of data. The autonomous segmentation technique described herein can automatically address this issue because no packet fragments are ever created. As used herein, "fragments" refer to packets that are split apart from an original single packet. A fragment may be created because encapsulation techniques cause the original packet length to exceed a limit of a particular medium, such as Ethernet (usually 1500 bytes). Some types of packet fragments are discarded by intervening network switches because they may be used for malicious purposes. This can be an issue for standards based VPNs like IPsec and TLS.

Figure 4:
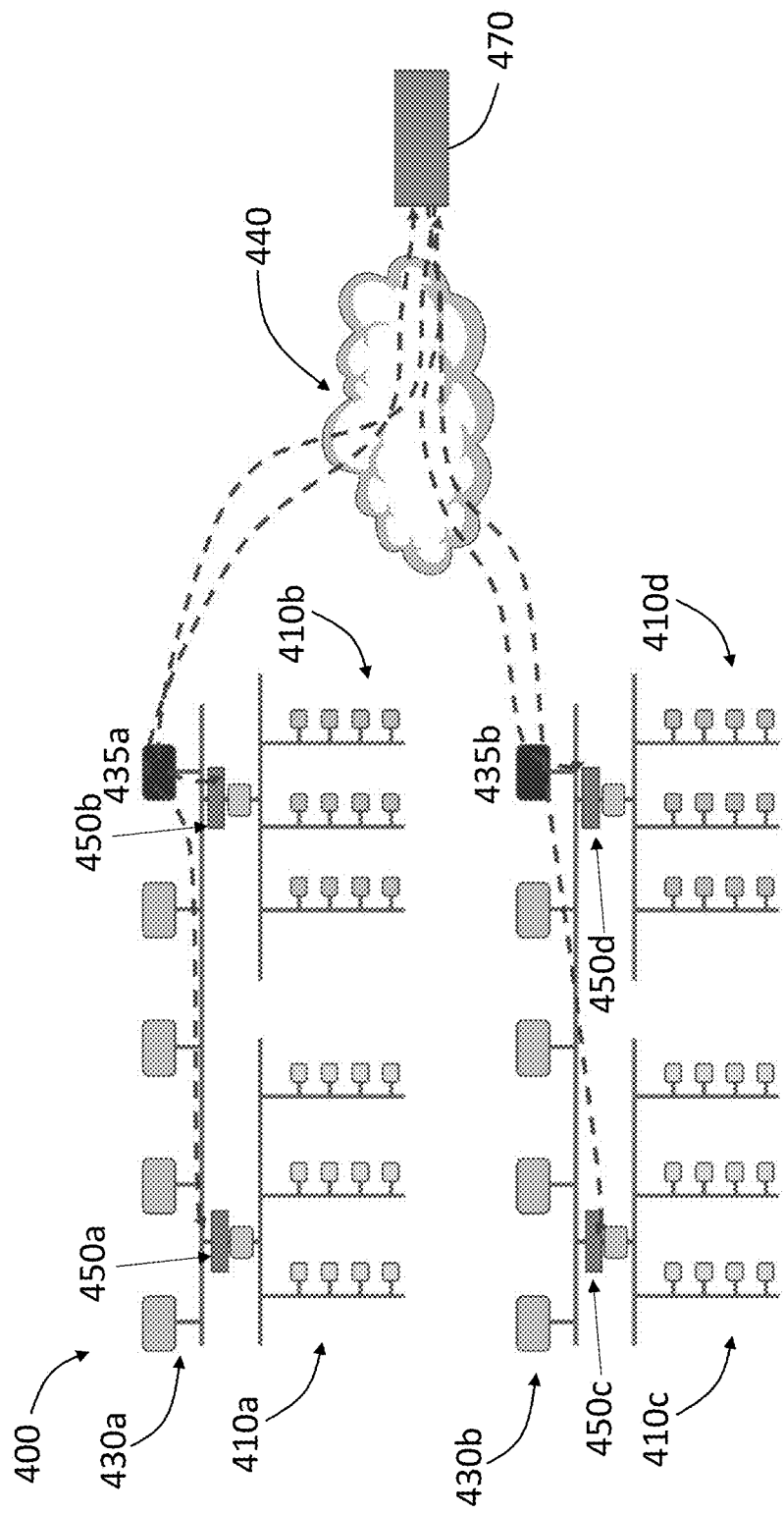
FIG. 4 shows a schematic of a network including an enclaved segment having several subnetworks that are geographically separate, according to an embodiment.

FIG. 4 shows a schematic of a network 400 including an enclaved segment having several subnetworks that are geographically separate, according to an embodiment. The network 400 includes a first OT network 410a and a second OT network 410b that share the bandwidth of a first IT network 430a, which in turn is connected to an Internet network 440 via a firewall 435a. A first reconfigurable device 450a is disposed between the first OT network 410a and the first IT network 430a. A second reconfigurable device 450b is disposed between the second OT network 410b and the first IT network 430a.

The network 400 also includes a third OT network 410c and a fourth OT network 410d that share the bandwidth of a second IT network 430b, which is also connected to the Internet network 440 (via a firewall 435b). A third reconfigurable device 450c is disposed between the third OT network 410c and the second IT network 430b. A fourth reconfigurable device 450d is disposed between the fourth OT network 410d and the second IT network 430b.

Each one of the reconfigurable devices 450a through 450d can be substantially identical to the apparatus 100 shown in FIG. 1 and described herein. The four reconfigurable devices 450a to 450d are connected to a management device 470 (e.g., an aggregator) via the Internet network 440.

In some embodiments, each OT network 410a through 410d can be located at a different geographic location. For example, each OT network 410a through 410d can support the infrastructure of a corresponding building (e.g., utilities, elevators, lighting, etc.). These buildings can be geographically separated from each other but are managed by the same entity. Despite the geographic separation, the four OT networks 410a through 410d can be included into one enclaved segment by switching the reconfigurable devices 450a to 450d into the isolation mode. The definition of the enclaved segment can be achieved without any rewiring or addition of network nodes.

Figure 5A:
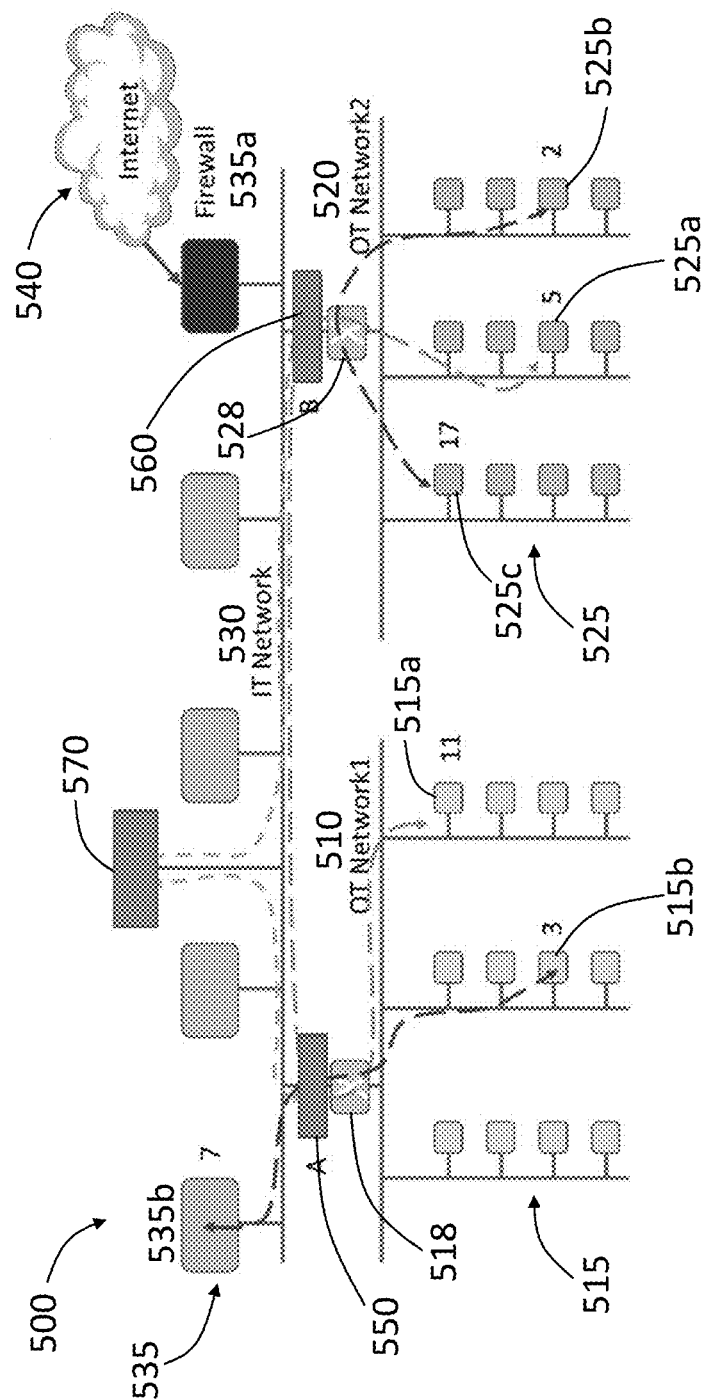
FIGS. 5A-5B illustrate the creation of an enclaved segment including both OT devices and IT devices, according to an embodiment.
Figure 5B:
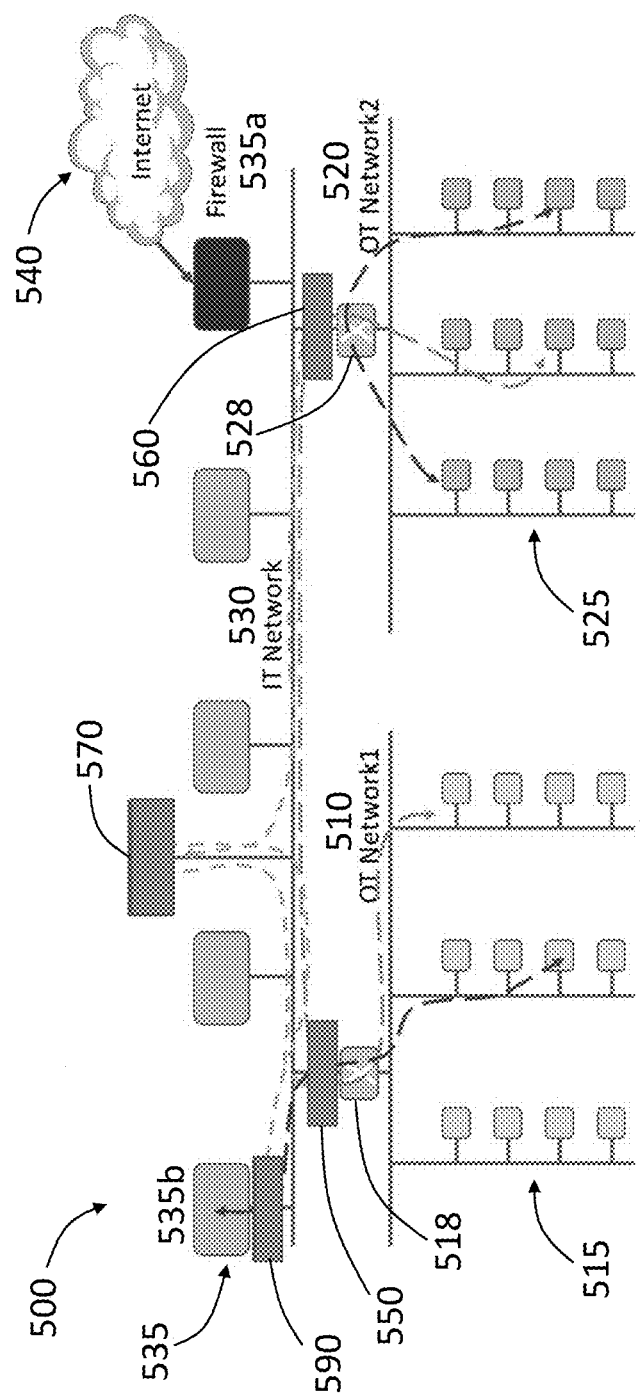

FIGS. 5A-5B illustrate the definition of an enclaved segment including both OT devices and IT devices, according to an embodiment. The network 500 includes a first OT network 510 (comprising devices 515) and a second OT network 520 (comprising devices 525) that are connected via an IT network 530 (comprising devices 535), which in turn is operatively coupled to an Internet network 540 via a firewall 535a. The first OT network 510 is connected to the IT network 530 via a first reconfigurable device 550 and a first network switch 518. The second OT network 520 is connected to the IT network 530 via a second reconfigurable device 560 and a second network switch 528. The two reconfigurable devices 550 and 560 are connected to a management device 570.

In the network 500, a device 515a (also referred to as node 11) within the first OT network 510 is communicating with a device 525a (also referred to as node 5) within the second OT network 520. In addition, another device 515b (also referred to as node 3) within the first OT network 510 is communicating with a device 535b (also referred to as node 7) in the IT network 530.

TABLE 1

Traffic matrix collected by reconfigurable devices 550 and 560

|  | Inside | Outside |
|---|---|---|
| Reconfigurable device 550 | | |
| | 3 | 7 |
| | 11 | 5 |
| Reconfigurable device 560 | | |
| | 5 | 11 |

Table 1 above shows example traffic matrix information collected by the reconfigurable devices 550 and 560 that are configured in the transparent mode, as illustrated in FIG. 5A. The "Inside" column lists network traffic received by the inside communication interface of the corresponding reconfigurable device and the "Outside" column lists network traffic received by the outside communication interface of the corresponding reconfigurable device. As used herein, the insider communication interface refers to the communication interface that is attached to devices within a target enclaved segment, and the outside communication interface refers to the communication interface that is attached to devices outside the target enclaved segment. For example, in the network 500, the inside communication interface of the reconfigurable device 550 is the communication interface that is connected to the devices 515, and the inside communication interface of the reconfigurable device 560 is the communication interface that is connected to the devices 525.

It can be seen that the above traffic matrix information indicates that the candidate enclaved segment is incomplete. More specifically, node 3 is communicating with node 7, but no data packet from node 7 towards node 3 is received by any inside communication interface. Accordingly, when the reconfigurable devices 550 and 560 are switched into the isolation mode, the traffic between node 3 and node 7 is blocked. In other words, to maintain existing traffic between two nodes upon definition of an enclaved segment, the traffic between these two nodes (in both directions) is received by the inside communication interface of at least one reconfigurable device as well as the outside communication interface of at least one reconfigurable device.

FIG. 5B shows that an additional reconfigurable device 590 is disposed between the device 535b and the first reconfigurable device 550. In this manner, any outgoing traffic from device 535 is received first by the inside communication interface of the reconfigurable device 590. In addition, such outgoing traffic towards devices within the first OT network 510 is received by the outside communication interface of the first reconfigurable device 550.

Accordingly, when the three reconfigurable devices 550, 560, and 590 are switched to the isolation mode, all existing communications are preserved without disruption. In addition, the two OT networks 510/520 and the IT device 535b form an enclaved segment, which is protected from the rest of the IT network 530 and the public network 540 that would otherwise provide potential access for an attacker.

The autonomous network segmentation technique described herein can be used for defining new enclaved segments within an existing enclaved segment or dividing an existing enclaved segment into multiple segments without disrupting the operation of existing devices. Such operation is also referred to as embedded segmentation or interleaved segmentation.

In some implementations, the new enclaved segment (also referred to as the embedded enclave) can be a proper subset of the existing enclaved segment. In some implementations, the new enclaved segment can incorporate elements external to the existing enclaved segment. The existing enclaved segment and the new enclaved segment can be independently established and managed without affecting the operation of the other. In fact, the existence of one enclaved segment can be invisible and/or undiscoverable by the other enclaved segment (or its management system or contained components). The embedded segmentation can be repeated to as many layers as desired.

Figure 6:
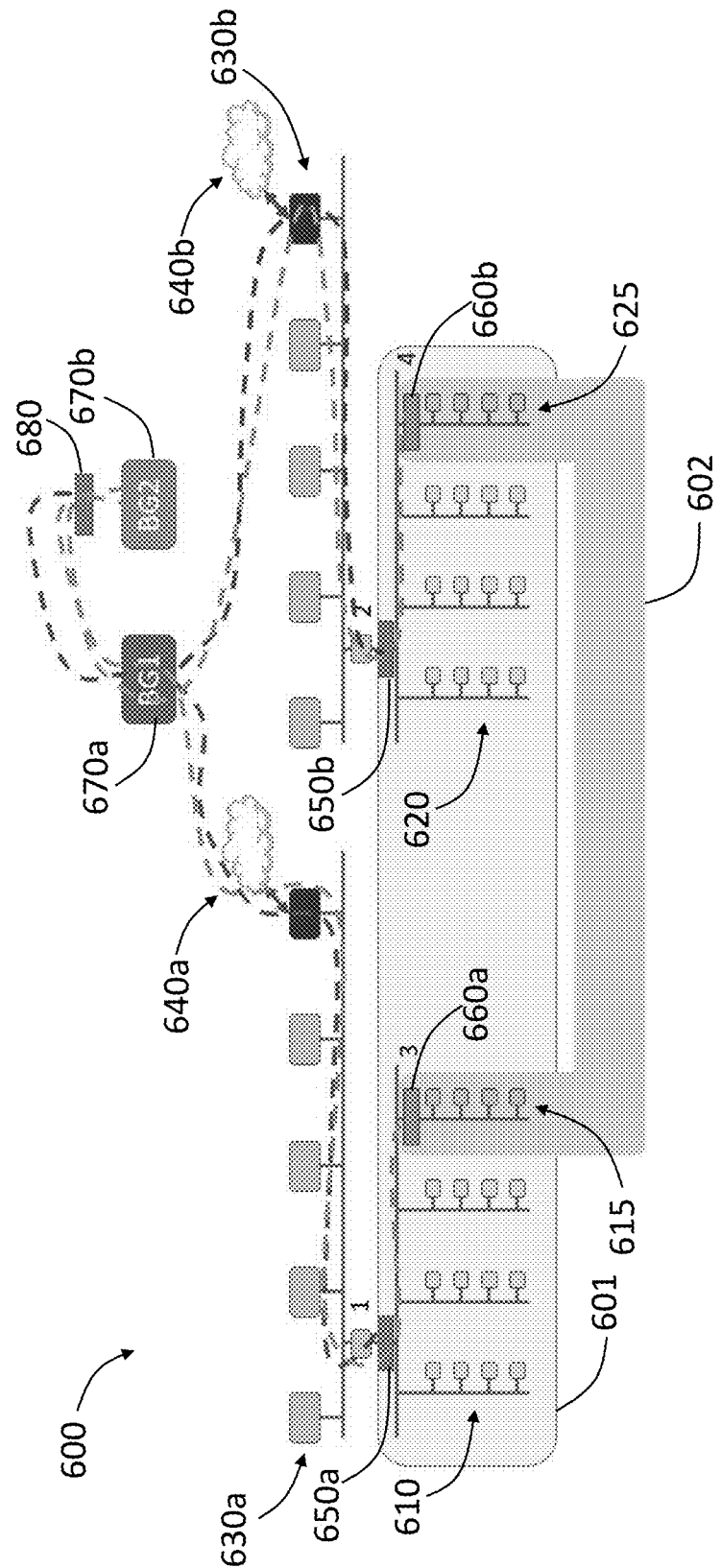
FIG. 6 shows a schematic of a network including an enclaved segment created within another enclaved segment, according to an embodiment.

FIG. 6 shows a schematic of a network 600 including an enclaved segment created within another enclaved segment, according to an embodiment. The network 600 includes a first OT network 610 and a second OT network 620. The first OT network is connected to a first IT network 630a via a first reconfigurable device 650a, and the second OT network 620 is connected to a second IT network 630b via a second reconfigurable device 650b. In addition, the first OT network 610 includes a group of devices 615 connected to the rest of the first OT network 610 via a third reconfigurable device 660a, and the second OT network 620 includes a group of devices 625 connected to the rest of the second OT network 620 via a fourth reconfigurable device 660b. The two IT networks 630a and 630b are connected via Internet networks 640a and 640b.

The first reconfigurable device 650a and the second reconfigurable device 650b are connected to a first management device 670a. Configuring the first reconfigurable device 650a and the second reconfigurable device 650b in the isolation mode can define a first enclaved segment 601 including all devices in the first OT network 610 and all devices in the second OT network 620.

The third reconfigurable device 660a and the fourth reconfigurable device 660b are connected to a second management device 670b (via an optional fifth reconfigurable device 680). Configuring the third reconfigurable device 660a and the fourth reconfigurable device 660b in the isolation mode can define a second enclaved segment 602 including devices 615 in the first OT network 610 and devices 625 in the second OT network 620. The second enclaved segment 602 is an independent enclave within the first enclaved segment 601. In some embodiments, the fifth reconfigurable device 680 is used to provide enhance security to the network 600. In these embodiments, the two management devices 670a and 670b can be disposed at different locations (i.e., not collocated) and are not directly connected within a secure facility. The fifth reconfigurable device 680 can be used to secure the traffic intended from one management device (e.g., 680a) towards the other management device (e.g., 680b).

In the network 600, the secure communication between the third and fourth reconfigurable devices 660a/b and the second management device 670b passes through the first reconfigurable device 650a, the second reconfigurable device 650b, and the first management device 670a. The first and second reconfigurable devices 650a/b do not detect the existence of the second enclaved segment 602 that is partially contained within the first enclaved segment 601. This is because the devices 615 and 625 are also within the first enclaved segment 601 and therefore communications originating from these devices can be properly authenticated by the reconfigurable devices 650a/b and the first management device 670a without disclosing the existence of the second enclaved segment 620.

In some instances, the first enclaved segment 601 and the second enclaved segment 602 can be defined at different times. In some instances, the first enclaved segment 601 and the second enclaved segment 602 can be defined simultaneously.

The embedded operation described herein can be especially beneficial for large-scale deployments. Following the definition of one enclaved segment, it may be desirable to subdivide the defined segment as the network develops. Known segmentation techniques usually involve physically removing elements and placing these elements in a separate enclave, thereby creating disruption to the network. The autonomous segmentation technique described herein, however, can be much less disruptive and incur much lower cost to define a new enclaved segment within the existing one. In addition, all changes made during segmentation in one segment can be decoupled from and not visible to the other segment.

Figure 7:
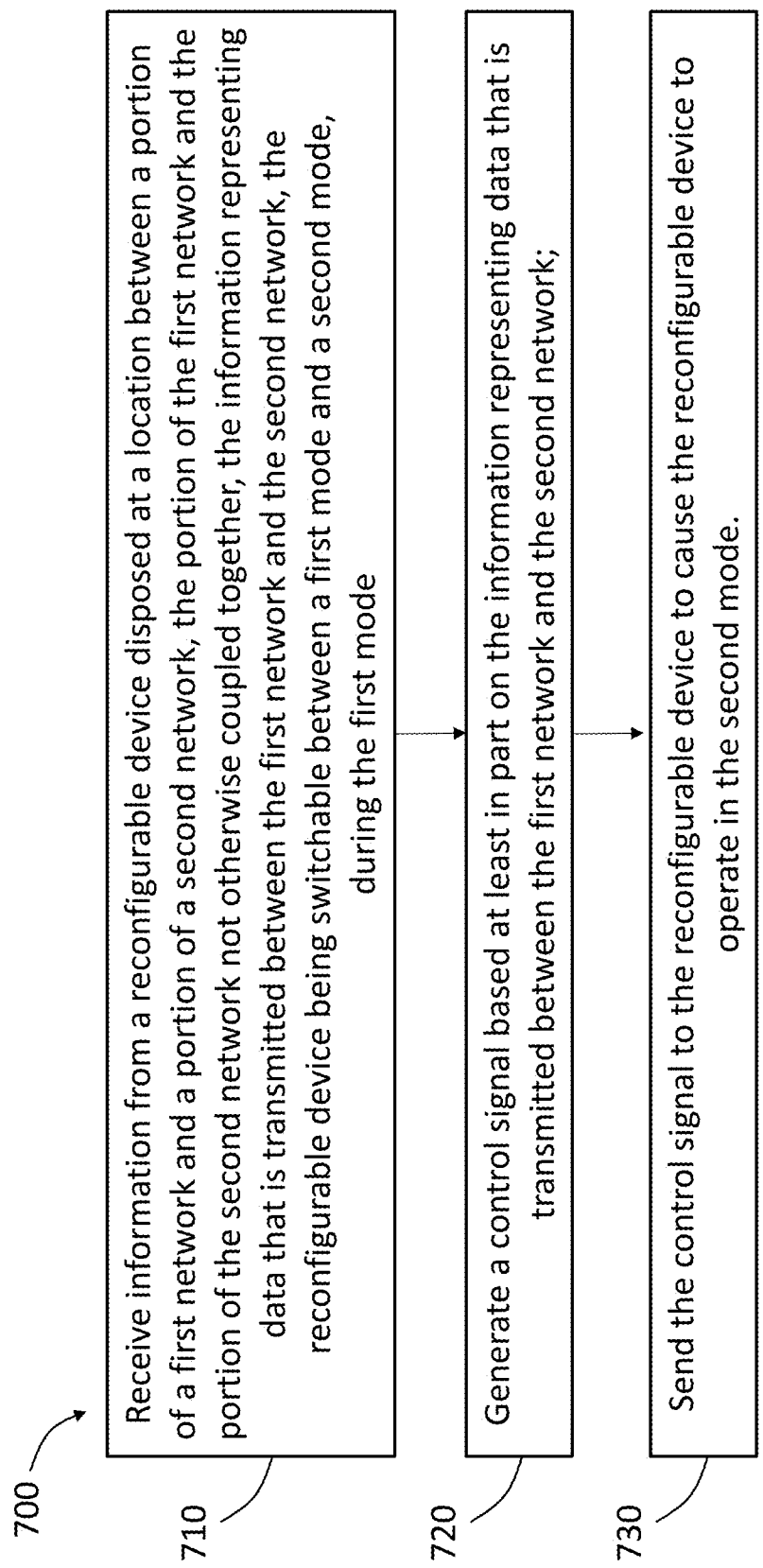
FIG. 7 is a flowchart illustrating a method of autonomous network segmentation, according to an embodiment.

FIG. 7 is a flowchart illustrating a method 700 of autonomous network segmentation, according to an embodiment. The method 700 includes, at 710, receiving information from a reconfigurable device disposed at a location between a portion of a first network and a portion of a second network. The portion of the first network and the portion of the second network are not otherwise coupled together. The information represents data that is transmitted between the first network and the second network. The reconfigurable device is switchable between a first mode and a second mode. During the first mode, the reconfigurable device is configured to transmit data between the first network and the second network and collect the information representing the data that is transmitted between the first network and the second network. During the second mode, the reconfigurable device is configured to block data between the first network and the second network so as to form an enclaved network segment of the portion of the first network. The method 700 also includes, at 720, generating a control signal based at least in part on the information representing data that is transmitted between the first network and the second network. The method 700 further includes, at 730, sending the control signal to the reconfigurable device to cause the reconfigurable device to operate in the second mode and thereby creating the enclaved segment.

In some embodiments, the reconfigurable device can be substantially identical to the apparatus 100 shown in FIG. 1 and described herein. In some embodiments, the method 700 can be performed by a management device (e.g., 370 shown in FIG. 3A) or a processor included in a management device.

In some embodiments, the first network includes an operational technology (OT) network. In some embodiments, the first network includes heterogeneous network having both wired communications and wireless communications. In some embodiments, the first network includes both OT devices and IT devices.

In some embodiments, the method 700 also includes sending another control signal to the reconfigurable device to switch the reconfigurable device to the first mode. For example, the devices in the first network can be decommissioned, in which case the enclaved segment can be opened accordingly.

While various embodiments have been described and illustrated herein, a variety of other means and/or structures for performing the function and/or obtaining the results and/or one or more of the advantages described herein, and each of such variations and/or modifications are possible. More generally, all parameters, dimensions, materials, and configurations described herein are meant to be examples and that the actual parameters, dimensions, materials, and/or configurations will depend upon the specific application or applications for which the disclosure is used. It is to be understood that the foregoing embodiments are presented by way of example only and that other embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of" will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of" "only one of" or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An apparatus, comprising:
    a first communication interface configured to be communicable with a portion of a first network;
    a second communication interface configured to be communicable with a portion of a second network;
    a memory operatively coupled to the first communication interface and the second communication interface,
    the apparatus being configured to be disposed at a location between the portion of the first network and the portion of the second network, the portion of the first network and the portion of the second network not otherwise coupled together,
    the apparatus being switchable from a first mode to a second mode based on a determination that the apparatus is disposed at a choke point between the portion of the first network and the portion of the second network, the apparatus being not switchable from the first mode to the second mode based on a determination that the apparatus is not disposed at the choke point,
    during the first mode,
        the first communication interface and the second communication interface being transparent to data transmitted between the first network and the second network, the first communication interface and the second communication interface further being configured to store information representing the data that is transmitted between the first network and the second network to the memory;
    during the second mode,
        the first communication interface and the second communication interface being configured to block data transmission between the first network and the second network via the apparatus so as to form an enclaved network segment of the portion of the first network and preserve, without disruption, existing communications within the portion of the first network.

2. The apparatus of claim 1, wherein the first network includes an operational technology (OT) network.

3. The apparatus of claim 1, wherein the first network includes a heterogeneous network including a wired network and a wireless network.

4. The apparatus of claim 1, wherein the first network and the second network are configured to communicate via an information technology (IT) network.

5. The apparatus of claim 1, further comprising a controller operatively coupled to the first communication interface and the second communication interface, the controller being configured to receive a control signal from a management device to switch the apparatus between the first mode and the second mode.

6. The apparatus of claim 1, wherein at least one of the first communication interface or the second communication interface is configured to send the information representing the data that is transmitted between the first network and the second network to a management device so as to cause the management device to generate a control signal to switch the apparatus between the first mode and the second mode.

7. The apparatus of claim 1, wherein the apparatus is configured to communicate only with devices with pre-shared keys for verification of identity.

8. The apparatus of claim 1, wherein:
    the enclaved network segment is configured to be included in a plurality of enclaved network segments, each enclaved network segment from the plurality of enclaved network segments being uniquely associated with a reconfigurable device from a plurality of reconfigurable devices.

9. A system, comprising:
    a management device; and
    a reconfigurable device operatively coupled to the management device and disposed at a location between a portion of a first network and a portion of a second network, the portion of the first network and the portion of the second network not otherwise coupled together,
    the reconfigurable device being switchable from a first mode to a second mode based on a control signal received from the management device indicating that the reconfigurable device is disposed at a choke point between the portion of the first network and the portion of the second network, the reconfigurable device being not switchable from the first mode to the second mode based on a determination that the reconfigurable device is not disposed at the choke point,
    during the first mode,
        the reconfigurable device being configured to transmit data between the first network and the second network and collect information representing the data that is transmitted between the first network and the second network;

during the second mode,
the reconfigurable device being configured to block data between the first network and the second network so as to form an enclaved network segment of the first network and preserve, without disruption, existing communications within the first network.

10. The system of claim 9, wherein the first network includes an operational technology (OT) network.

11. The system of claim 9, wherein the first network includes a heterogeneous network including a wired network and a wireless network.

12. The system of claim 9, wherein the reconfigurable device is configured to send the information representing the data that is transmitted between the first network and the second network to the management device.

13. The system of claim 9, wherein the management device is configured to generate the control signal based at least in part on the information representing the data that is transmitted between the first network and the second network.

14. The system of claim 9, wherein the reconfigurable device is configured to communicate only with other devices with pre-shared keys for verification of identity.

15. The system of claim 9, wherein the reconfigurable device is a first reconfigurable device, the location is a first location, the control signal is a first control signal, and the system further comprises:
a second reconfigurable device operatively coupled to the management device and disposed at a second location between a first section of the first network and a second section of the first network, the second reconfigurable device being switchable between the first mode and the second mode based on a second control signal from the management device.

16. The system of claim 9, wherein the reconfigurable device is a first reconfigurable device of a plurality of reconfigurable devices, each reconfigurable device of the plurality of reconfigurable devices being disposed at a corresponding location and switchable between the first mode and the second mode based on a corresponding control signal from the management device.

17. A method, comprising:
receiving information from a reconfigurable device disposed at a location between a portion of a first network and a portion of a second network, the portion of the first network and the portion of the second network not otherwise coupled together, the information representing data that is transmitted between the first network and the second network, the reconfigurable device being switchable from a first mode to a second mode based on a determination that the reconfigurable device is disposed at a choke point between the portion of the first network and the portion of the second network, the reconfigurable device being not switchable from the first mode to the second mode based on a determination that the reconfigurable device is not disposed at the choke point, during the first mode,
the reconfigurable device being configured to transmit data between the first network and the second network and collect the information representing the data that is transmitted between the first network and the second network;

during the second mode,
the reconfigurable device being configured to block data between the first network and the second network so as to form an enclaved network segment of the portion of the first network and preserve, without disruption, existing communications within the first network;

generating a control signal based at least in part on the information representing data that is transmitted between the first network and the second network; and sending the control signal to the reconfigurable device to cause the reconfigurable device to operate in the second mode.

18. The method of claim 17, wherein the first network includes an operational technology (OT) network.

19. The method of claim 17, wherein the first network includes a heterogeneous network including a wired network and a wireless network.

20. The method of claim 17, wherein the control signal is a first control signal and the method further comprises:
sending a second control signal to the reconfigurable device to cause the reconfigurable device to operate in the first mode.

* * * * *